(12) United States Patent
Morisset et al.

(10) Patent No.: US 8,204,646 B2
(45) Date of Patent: *Jun. 19, 2012

(54) ONBOARD CONTROLLER SYSTEM

(75) Inventors: Robert J Morisset, Calgary (CA); Douglas R Hay, Calgary (CA); Michel R Morisset, Calgary (CA); Mark J Ochitwa, Calgary (CA)

(73) Assignee: Magtec Products, Inc., Calgary, Alberta (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/192,699

(22) Filed: Jul. 28, 2011

(65) Prior Publication Data

US 2011/0282563 A1    Nov. 17, 2011

Related U.S. Application Data

(60) Division of application No. 12/081,136, filed on Apr. 10, 2008, which is a continuation-in-part of application No. 11/715,914, filed on Mar. 9, 2007, now Pat. No. 7,957,882.

(60) Provisional application No. 60/781,423, filed on Mar. 10, 2006.

(51) Int. Cl.
*G06F 19/00* (2006.01)

(52) U.S. Cl. .................. 701/34; 701/93; 701/70

(58) Field of Classification Search .......... 701/29–36, 701/93–96, 70; 180/170–179
See application file for complete search history.

(56) References Cited

U.S. PATENT DOCUMENTS

| | | |
|---|---|---|
| 3,718,202 A | 2/1973 | Brock |
| 3,878,915 A | 4/1975 | Purland et al. |
| 4,838,377 A | 6/1989 | Kozaki et al. |
| 5,101,926 A | 4/1992 | Berman et al. |
| 5,115,145 A | 5/1992 | Westberg et al. |
| 5,315,286 A | 5/1994 | Nolan |
| 5,394,135 A | 2/1995 | Stadler |
| 5,519,255 A | 5/1996 | Burtch et al. |
| 5,559,491 A | 9/1996 | Stadler |
| 5,635,901 A | 6/1997 | Weinblatt |
| 5,745,030 A | 4/1998 | Aaron |
| 5,828,297 A | 10/1998 | Banks et al. |
| 6,060,981 A | 5/2000 | Landes |
| 6,067,007 A | 5/2000 | Gioia |
| 6,157,317 A | 12/2000 | Walker |
| 6,356,186 B1 | 3/2002 | Price et al. |
| 6,581,712 B1 | 6/2003 | Nathans |
| 6,696,927 B2 | 2/2004 | Flick |
| 6,756,886 B2 | 6/2004 | Flick |
| 7,272,467 B2 | 9/2007 | Goncalves et al. |
| 7,305,294 B2 | 12/2007 | Bate et al. |
| 7,659,811 B2 | 2/2010 | Flick |
| 7,671,727 B2 | 3/2010 | Flick |
| 2002/0170762 A1 | 11/2002 | Daneshmand |
| 2004/0075541 A1 | 4/2004 | Simoneau |
| 2004/0113761 A1 | 6/2004 | Borugian |

*Primary Examiner* — Richard M. Camby
(74) *Attorney, Agent, or Firm* — Diederiks & Whitelaw, PLC

(57) ABSTRACT

A system and method for safely slowing or controlling a vehicle's speed or engine speed by selectively replacing a genuine engine control signal with a spoofed engine control signal to slow or control the vehicle. The operator is allowed control of the vehicle (e.g. genuine engine control signal) if the speed is below a threshold speed and the operator is denied control of the vehicle (e.g. spoofed engine control signal) if the speed is above the threshold speed; similarly, a maximum idle engine speed and time to idle before shutdown is enforced by selectively replacing a genuine engine control signal with a spoofed engine control signal, responsive to a set threshold for each. The threshold is set over the air (OTA).

7 Claims, 1 Drawing Sheet

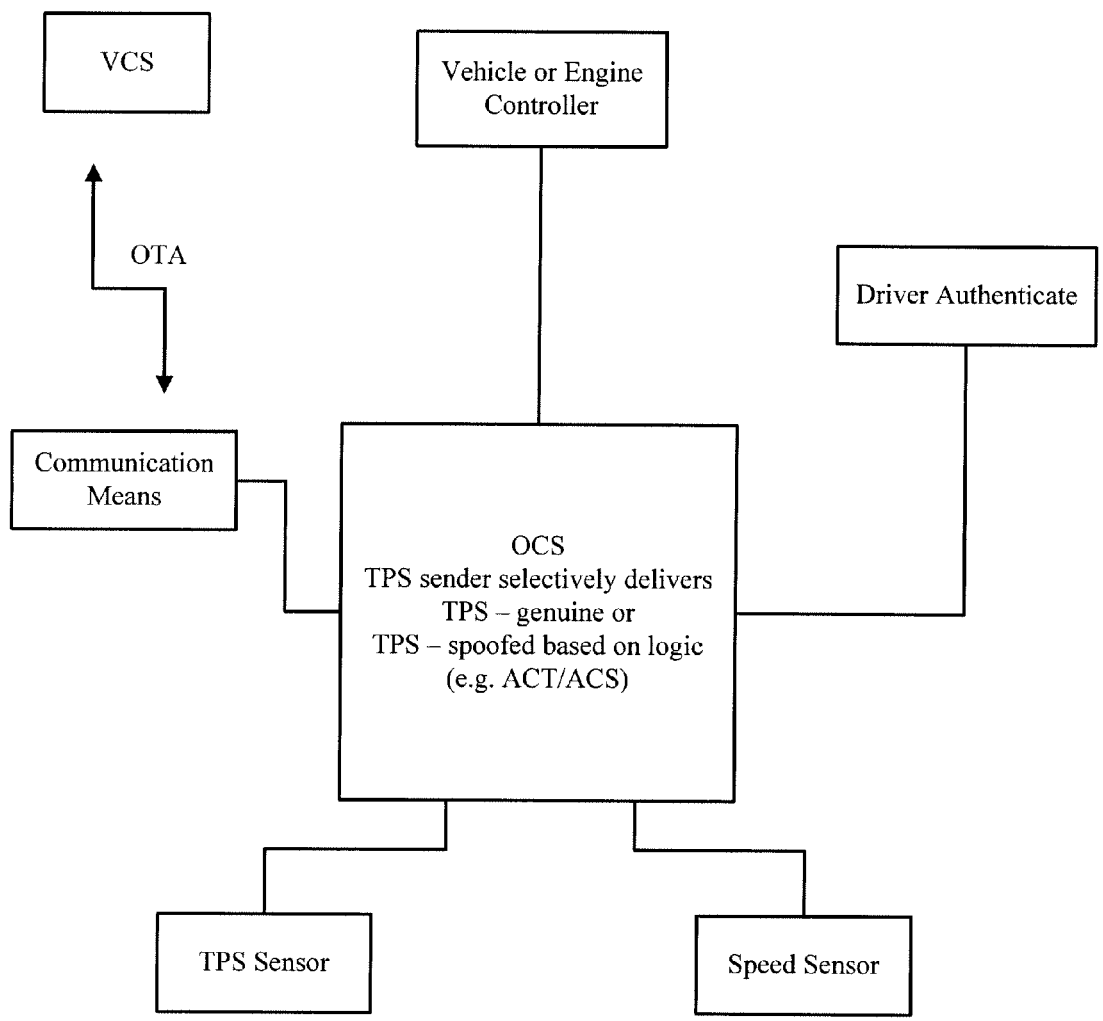

ONBOARD CONTROLLER SYSTEM

CROSS-REFERENCE TO RELATED APPLICATIONS

The present application represents a divisional application of U.S. patent application Ser. No. 12/081,136, filed Apr. 10, 2008, which is a continuation-in-part of U.S. patent application Ser. No. 11/715,914, filed Mar. 9, 2007, now U.S. Pat. No. 7,957,882, which claims the benefit of U.S. Provisional Patent Application Ser. No. 60/781,423 filed Mar. 10, 2006, all of which are entitled "Onboard Controller System" and incorporated herein by reference in their entirety.

FIELD OF THE INVENTION

The present invention relates generally to an onboard controller system (OCS). More particularly, the present invention relates to a vehicle control unit for controlling the speed of a vehicle or its engine remotely.

BACKGROUND OF THE INVENTION

It is somewhat difficult to remotely control the speed or engine speed of a vehicle.

One commonly used method for stopping a vehicle having rubber tires involves the placement of a spike belt in the vehicle's path (belts having a number of hollow cylinders which puncture the tire and cause deflation in a controlled manner). However, this requires the spike belt be laid in the vehicle's path, does result in reduced control of the vehicle and only works with vehicles having tires (e.g. not for example, with tracked vehicles such as earth movers such as bulldozers or military vehicles such as armored personnel carriers).

Another method involves the sending of an electromagnetic pulse or energy wave at the vehicle to interfere with its electronic circuits. However, this requires close proximity to the vehicle and does not work with vehicles that do not rely heavily on electronics, for example large diesel engines in transport trucks.

Idle speed may be set manually, and timers have been deployed to limit time-at-idle, also set manually.

It is, therefore, desirable to provide a vehicle control unit that provides for safely controlling the maximum speed of a vehicle or of its engine and the engine's maximum time-at-idle.

SUMMARY OF THE INVENTION

It is an object of the present invention to obviate or mitigate at least one disadvantage of previous methods and systems for stopping a vehicle.

U.S. patent application Ser. No. 10/791,574 published as U.S. Patent Application Publication No. 2005/0197744 for "Immobilizer system for vehicles" is incorporated herein by reference.

An onboard controller system (OCS) may resemble or connect with a vehicle in the ways described in U.S. Patent Application Publication No. 2005/0197744, which is incorporated herein by reference.

A system and method for controlling engine or vehicle speed by selectively replacing a genuine engine control signal with a spoofed engine control signal is provided. The operator is allowed control of the vehicle (e.g. genuine engine control signal) if the speed is below a threshold speed and the operator is denied control of the vehicle (e.g. spoofed engine control signal) if the speed is above the threshold speed, thus forcing the vehicle to slow to or below the threshold speed. A threshold idle speed and time-to-idle may also be set.

Other aspects and features of the present invention will become apparent to those ordinarily skilled in the art upon review of the following description of specific embodiments of the invention.

BRIEF DESCRIPTION OF THE DRAWINGS

Embodiments of the present invention will now be described, by way of example only, with reference to the attached Figures, wherein:

FIG. 1 is an OCS of the present invention.

DETAILED DESCRIPTION

Generally, the present invention provides a method and system for controlling the speed of a vehicle or its engine's idle speed and idle duration.

Throttle Position Sensor (Genuine Signal)

A throttle position sensor of a vehicle generates a signal based on the throttle position and that signal is delivered to the vehicle electronic control module (ECM), data bus, engine management system or other system used by the vehicle to control operations. The signal may be analog, digital (e.g. pulse width modulation (PWM)), fibre optic, electromagnetic or other signals known in the art.

Throttle Position Generator (Spoofed Signal)

A throttle position generator generates a signal based on the output of a controller for the Acceleration Control System (ACS)/Acceleration Control Technology (ACT). The throttle position generator is configured with the vehicle at idle state and the signal from the throttle position sensor measured to provide a baseline TP and an internal gain G set to calibrate the throttle position generator to match throttle position sensor signals on the particular vehicle. The Throttle Position Generator is then capable of generating a signal which the vehicle can interpret as if it were a genuine throttle position signal (spoofed signal).

Acceleration Control Technology (ACT)

ACT provides for selectively intervening to deny the ability of the operator of a vehicle to increase vehicle speed. In a preferred embodiment, the controller is programmed for setting or receives an Acceleration Control System (ACS) signal for setting the maximum vehicle speed (ACS_Threshold). The controller applies the logic: if SSV less than or equal to ACS_threshold, then deliver TPS_genuine to vehicle, and if SSV greater than ACS_threshold, then deliver TPS_spoofed to vehicle (e.g. to engine control module).

The ACS maximum speed threshold can be generated onboard, for example, by triggering a switch, or receiving a code from a driver authentication system, or the ACS could be triggered by an over the air (OTA) signal via satellite, cellular, electromagnetic, radio frequency or other system.

Vehicle Already Stopped

In the example above, it was assumed that the vehicle was traveling when the ACS_threshold signal was received. In the event an ACS_threshold vehicle speed signal is received when the vehicle is at 0 km/hr, at idle then there is no need for the controller to go through a vehicle speed limiting function, but instead can directly go to shutting down the engine or keep the TPS at or below idle, depending upon an idle-speed threshold and a time-at-idle threshold, which might be set OTA or on board the vehicle.

Driver Authentication System

The OCS may include a driver authentication system (DAS), for example requiring driver authentication before the vehicle can be operated or moved. The OCS may include a keypad for entering a driver code, for many drivers, for example 30 or 50 or even hundreds or more. The driver codes may be deleted, added, or modified at the OCS or over the air (OTA). The OCS may log the driver codes, for example, with log-in or -out time, and change of system state (e.g. change from protected state to run state), location, or other information. The driver codes may be numerical or otherwise, for example six digits or seven characters, etc. The driver codes may be kept onboard the OCS in protected memory (that cannot be externally read). The DAS may trigger a tamper state and go into a system alarm state after a number of attempts to improperly enter a driver code. Entry of a correct driver code allows operation of the vehicle.

In relation to ACT and an ACS, a new driver code can be sent to the OCS and old driver codes deleted before the ACS shutdown is triggered, for example over the air, as a driver code may normally be used to over-ride the ACS shutdown. Additionally, the thresholds alone may be pre-set determined by driver identity or code, each driver's thresholds being different.

Unattended Idle Protect (UIP)

UIP provides passive engagement without driver intervention when a vehicle is left unattended and idling. UIP secures the vehicle (for example by locking, applying brakes, arming an alarm or other annunciator system) and prevents normal operation until a proper driver authentication is provided, for example by providing a driver code using a keypad, keyboard, smart card, biometrics or other system to allow the system into a run mode. If the vehicle is tampered with in the UIP mode, for example by activating a service brake or releasing a parking brake, the vehicle is shut down. Finally, if the pre-set time-at-idle threshold is met, the vehicle is shut down.

Maintenance ACS Shutdown

When combined with an operator authentication system having a maintenance mode, for example, where a particular operator is given a limited time to perform a function, such as maintenance on the vehicle, and that time expires, an ACS event can be triggered.

Other Systems

While described as controlling the TPS by selectively sending the genuine or spoofed throttle control position signal, the method and system of the present invention is also enabled by use of other common vehicle systems, which may or may not apply depending on a particular vehicle or type of vehicle. These other vehicle systems include, but are not limited to: transmission operation or gear (e.g. automatic transmission, or electronically controlled transmission), vehicle data bus (e.g. CANbus/CANcontroller, J1850, OBD etc.), engine control module (ECM), powertrain control module (PCM), fuel system, air system, spark system, diesel injector system, engine detune, engine valve bleedoff (Jake Brake™), clutch, torque converter, automatic speed control system (cruise control), traction control system, braking system, propeller pitch, rudder control, flaps, thrust reversers, trim, differential slip, steering, etc.

Features of the present invention may be incorporated into a stand-alone system which is designed to add on to the vehicle, or may be incorporated into the vehicle's existing systems by the original equipment manufacturer (OEM).

Other Vehicles

While described as preferably applicable to tractor-trailer trucks, the system and methods of the present invention are applicable to a wide variety of vehicles, including, (but not limited to) cars, trucks, boats, planes, ships, construction vehicles, industrial vehicles, off-road vehicles, military vehicles, commercial vehicles, heavy machines etc. and are applicable to generally any form of motive force gas, electric, diesel, fuel cell etc.

Vehicle Control System (VCS)

The OCS and a vehicle control system (VCS) may communicate, for example by over the air systems previously mentioned. Among other things, the VCS may communicate an ACS signal to the OCS or send or receive commands to/from the OCS or send or receive driver code additions/deletions etc.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. An onboard controller system for a vehicle, comprising:
   a. TPS sensor means for receiving a genuine TPS signal from a throttle position sensor, the genuine TPS signal destined for an engine controller;
   b. TPS spoof means for generating a spoofed TPS signal;
   c. intercept means for intercepting the TPS signal;
   d. TPS sender means for sending the spoofed TPS signal or the genuine TPS signal to the engine controller; and
   e. a controller for selectively determining whether the TPS sender means sends the genuine TPS signal or the spoofed TPS signal based on the comparison of a vehicle parameter to a threshold parameter.

2. The onboard controller system of claim 1, wherein the vehicle parameter is vehicle speed.

3. The onboard controller system of claim 1, wherein the threshold parameter is throttle position.

4. A method of onboard controlling a vehicle comprising:
   a. receiving a genuine TPS signal from a throttle position sensor, the genuine TPS signal being destined for an engine controller;
   b. generating a spoofed TPS signal;
   c. intercepting the TPS signal;
   d. sending the spoofed TPS signal or the genuine TPS signal to the engine controller; and
   e. selectively determining by the controller whether the genuine TPS signal or the spoofed TPS signal was sent based on the comparison of a vehicle parameter to a threshold parameter.

5. The method of claim 4, wherein the vehicle parameter is vehicle speed.

6. The method of claim 5, wherein the threshold parameter is throttle position.

7. The method of claim 4, wherein the threshold parameter is throttle position.

* * * * *